June 23, 1942.    O. W. OLSON    2,287,055
TRAILER
Filed Feb. 20, 1939    2 Sheets-Sheet 1
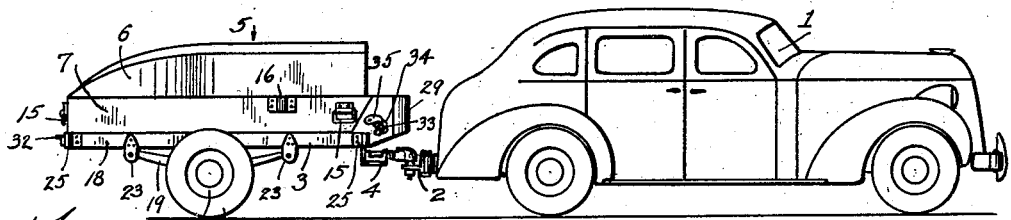
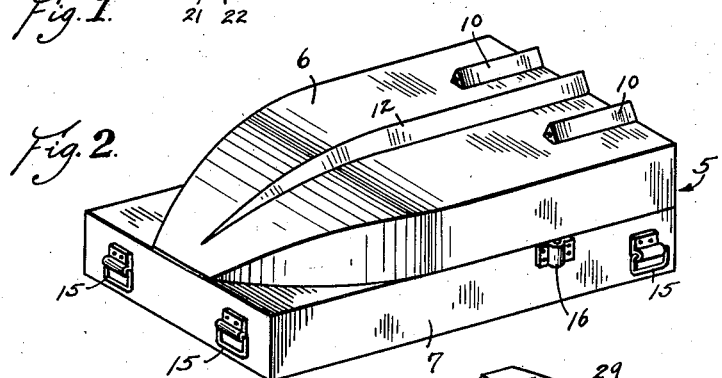
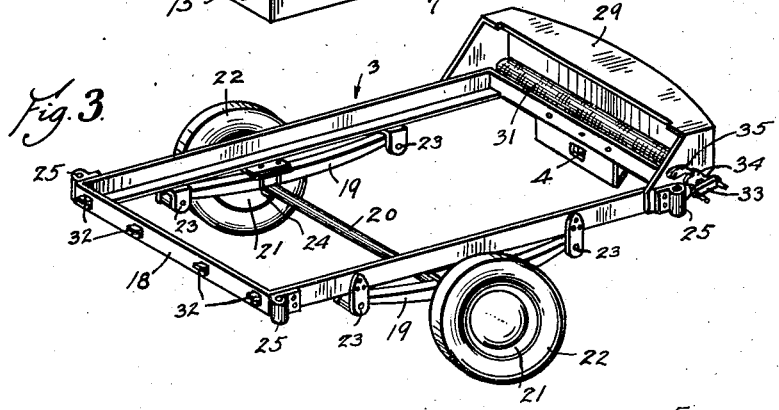
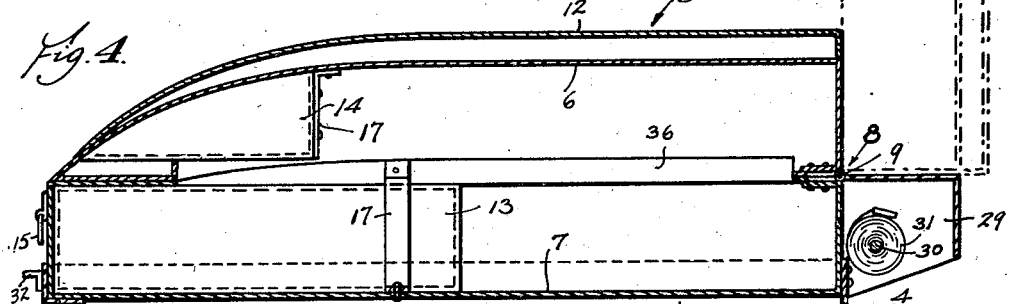
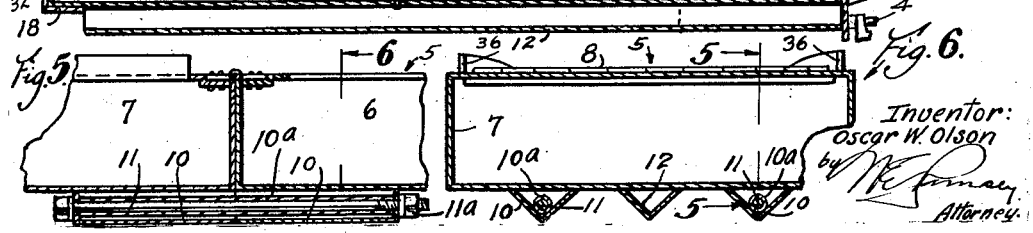
Inventor:
Oscar W. Olson June 23, 1942.   O. W. OLSON   2,287,055
TRAILER
Filed Feb. 20, 1939   2 Sheets-Sheet 2

Inventor:
Oscar W. Olson
Attorney

Patented June 23, 1942

2,287,055

UNITED STATES PATENT OFFICE 2,287,055

TRAILER

Oscar W. Olson, Portland, Oreg.

Application February 20, 1939, Serial No. 257,345

13 Claims. (Cl. 296—23)

My invention relates to automobile trailers and more particularly to trailers adapted to haul a collapsible boat on fishing and camping trips. Modern highways and automobiles make it possible for people to travel long distances at high speed to reach their favorite fishing or recreation spots. In order to reach the best fishing places, however, it is usually necessary to leave the main highways and to go far into the mountains, following gradually disappearing roads to their vanishing point. A boat is usually essential for fishing for some kinds of fish in the small mountain lakes, but boats are usually not available there and must be taken in by the fishermen if they are to be used. An automobile trailer is a practical means for transporting a boat on a fishing trip, but it should be capable of traveling at high speed on the highways and also of following a car around sharp curves on rough mountain roads.

For the comfort of the passengers in the automobile, it should be possible to stow the equipment necessary for a fishing or camping trip in the trailer. It is advantageous to stow said equipment and supplies in the boat to avoid the necessity of providing a separate storage compartment which would comprise unnecessary weight. But it is essential that said equipment be protected from both dust and water, and this is especially difficult in a trailer against which the rear wheels of the towing car throw dust or mud and water with considerable force.

To avoid the necessity of carrying a bed and tent for use in rainy weather, it is desirable that the frame of the trailer be adapted for use as a bed and that it be provided with a suitable canopy. Said canopy may be of light weight if it is used only when the trailer is stationary, and it may be folded to occupy little space. The frame of a trailer is well adapted for use as a bed not only because it is the proper size and construction, but also because it is far enough from the ground to be dry even on low swampy ground. But it is desirable that the bed and canopy be so arranged that they can be quickly made ready for sleeping and quickly packed for moving. Unless their equipment is designed to be quickly assembled and disassembled, fishermen find that too much of their time is required to be spent in camp and too little time remains for fishing.

The principal object of my invention is to provide a boat trailer and a boat therefor, said boat being built in sections hingedly fastened together in such a way that they may be folded for being hauled on the trailer and extended for use as a boat. In this way a boat, say, sixteen feet long and capable of carrying two to four people may be folded so as to fit a reasonably short trailer that will follow a car at high speed without wabbling, and that will follow said car around the sharp turns of mountain roads.

A further object of my invention is to provide a boat trailer and a boat therefor, said boat being built in sections adapted to be fastened together for use as a boat and to be separated for being carried one section at a time between the boat and the water in which the boat is to be used. The shores of mountain lakes and streams are frequently so precipitous that a car cannot be driven close to the water. An entire boat might be slid down such a bank, but it can be carried back up much more easily in sections.

A further object of my invention is to provide a boat trailer and a boat therefor, said boat when folded for being hauled on said trailer being adapted to form a substantially water-proof and dust-proof compartment for food, bedding, and other supplies and equipment. Said compartment should be of ample size, and should have a tight fitting lid that may be opened and closed easily.

A further object of my invention is to provide a boat trailer which, when the boat is removed therefrom, will serve as the frame of a bed and from which a foldable canopy may be suspended to protect the occupants of the bed from rain.

A further object of my invention is to provide a boat trailer having a small compartment arranged transversely at one end for housing a bed spring, or the canvas equivalent thereof, and a roller within said compartment on which said bed spring may be rolled when not in use, said roller being provided with a pawl-and-ratchet for holding said spring taut. This structure makes it possible to have a good bed and spring by merely pulling the latter out of its compartment and hooking it to the opposite end of the trailer, and then tightening it by means of a crank. Then, when it is desired to put the bed away, it is only necessary to release the pawl and roll up the spring.

Other objects and details of my invention will be described with reference to the accompanying drawings in which Fig. 1 is a side elevation of an automobile and a boat trailer embodying my invention;

Fig. 2 is a perspective view of the boat of Fig. 1, said boat being shown in its folded form;

Fig. 3 is a perspective view of the trailer of Fig. 1, the bed spring being shown on its roller;

Fig. 4 is a fragmentary sectional view through the boat and a portion of the trailer, the position of the bow section of said boat when opened and resting on the front portion of the trailer being shown in dotted lines;

Fig. 5 is a fragmentary sectional view taken on the line 5—5 of Fig. 6 showing how a threaded bolt may be used to hold said boat in its extended position;

Fig. 6 is a transverse sectional view taken on the line 6—6 of Fig. 5 showing said threaded bolts in position;

Figure 7:
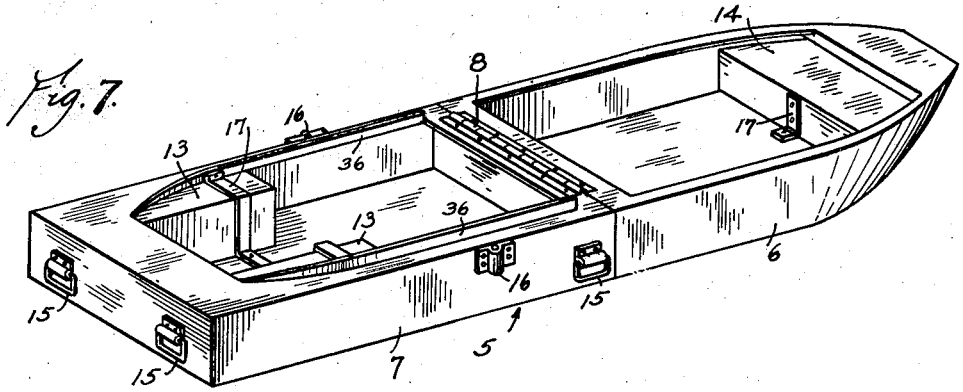
Fig. 7 is a perspective view of said boat in its extended form.
Figures 8, 9, 10, 11:
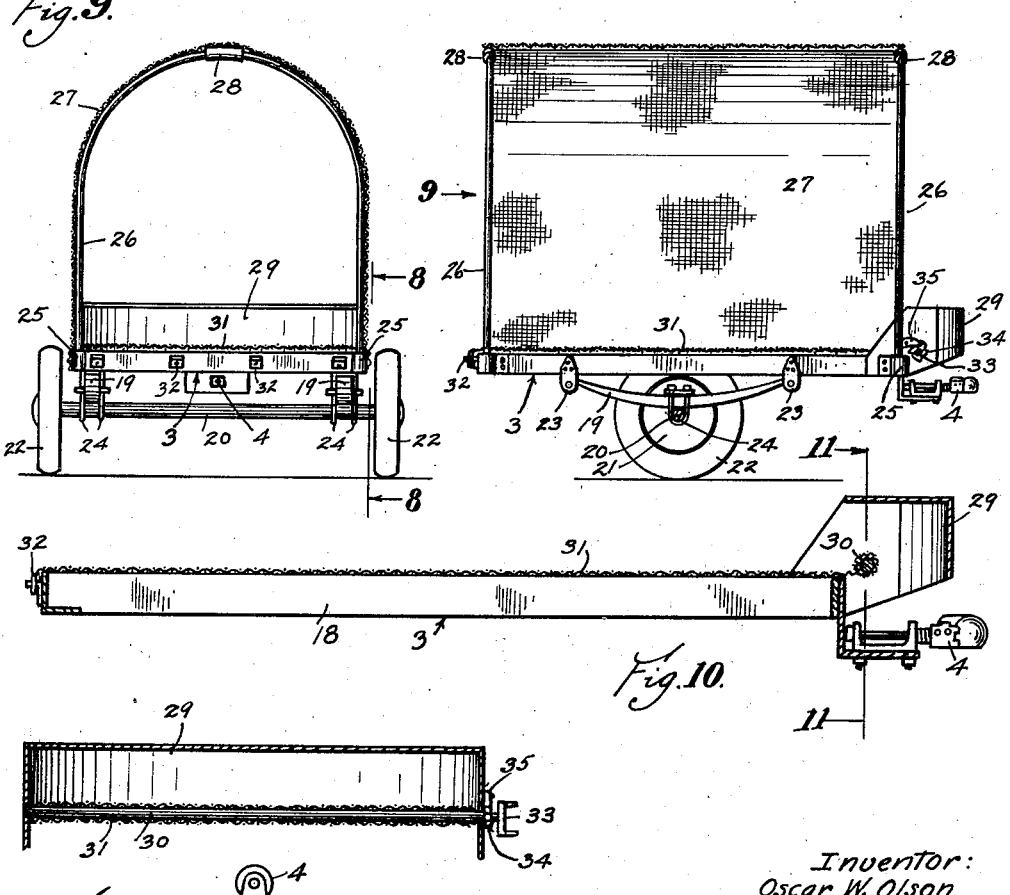
Fig. 8 is a longitudinal sectional view taken along the line 8—8 of Fig. 9, the canopy of the trailer being shown broken away.
Fig. 9 is an end view taken in the direction of the arrow 9 of Fig. 8.
Fig. 10 is a longitudinal vertical sectional view of said trailer with the bed spring thereof being shown in its extended position.
Fig. 11 is a sectional view taken on the line 11—11 of Fig. 10 showing the bed spring rolled on its shaft.

An automobile adapted for towing a boat trailer embodying my invention is shown at 1. Said automobile is in no way modified except that it is provided with a pull-bar 2 such as is commonly provided for automobiles to adapt them to pull trailers. A trailer 3 embodying my invention is provided with a towing bar 4 adapted to engage said pull-bar for towing said trailer behind said car. Said pull-bar and said towing bar may be of any convenient form, but they should be proportioned in relation to the trailer so that the later will follow the car without wabbling. Said proportioning is well known and forms no part of my invention, although there is less difficulty in designing a hitch for the short boat trailer herein described than there would be in designing a hitch for a boat trailer adapted to haul a full-length boat.

A boat 5 consists of two sections, a bow section 6 and a stern section 7. It will be understood that, if desired, either or both of said sections might be divided into subsections and the latter might then be fastened together in some suitable way, such as that hereinafter disclosed for fastening sections 6 and 7 together. I prefer to fasten sections 6 and 7 together by means of a hinge member 8 having a removable pin 9. When pin 9 is removed, said sections may be separated for being carried one at a time. To hold said boat in its extended form when it is in the water, I provide two pairs of hollow cleats 10, preferably attached to the bottom of said boat by welding. Said pairs of cleats are so positioned on the bottom of said boat that they come together end to end when the boat is extended. Within said cleats I prefer to weld sections of pipe 10a. A rod 11 may then be passed through each pair of cleats, and the sections of pipe therewithin, to bind them firmly together. Said rod may, if desired, be threaded on one or both ends, and nuts 11a may be provided for tightening said rod. In this way said boat will be made rigid, which is essential for stability when it is in the water, and few tools are required either to fasten or unfasten said joint. A keel 12, similar to cleats 10 and similarly fastened to said boat, may, if desired, extend throughout the length of said boat along the centerline of the bottom thereof.

I prefer to make said boat of some suitable sheet metal. In order that said boat shall not sink if capsized, as well as to provide buoyancy for the passengers thereof in case of capsizing, air tanks 13 are provided in stern section 7, and an air tank 14 in bow section 6. Said air tanks should be attached to said boat by suitable clamps 17, or otherwise. For convenience in handling, handles 15 may be attached to said stern section. Holders 16 for rowlocks should be attached to the sides of section 7. Strips 36 prevent relative movement of sections 6 and 7, when folded, and help make a water and dust proof joint.

Trailers 3, comprising a frame 18 which may be made of steel end and side members welded together, is adapted to be carried by springs 19 supported by axle 20 on which wheels 21 are rotatably mounted. I prefer to provide said wheels with pneumatic tires 22. Springs 19 may be attached to frame 18 by shackles 23, and to axle 20 by clamps 24. On each side of frame 18 I prefer to attach loops 25 to hold bows or stanchions 26 to support canopy 27. Said members may be made in two halves threaded or otherwise inserted into coupling member 28, and adapted for disconnection therefrom for packing in small space.

It is to be noted that the frame 18 is made of angle iron with the vertical web arranged at the margins and the horizontal web extending inwardly therefrom. Thus below the plane of the top of the vertical webs and above the plane of the upper surfaces of the horizontal web is defined a recess into which the boat section 7 may seat, as is indicated in Fig. 4. This prevents the boat section from moving in the frame and because of the relatively tight fit illustrated in said Fig. 4, the boat section tends to stiffen the frame 18 and to prevent warping and weaving of said frame.

At the forward end of frame 18, I provide a compartment 29 for housing a shaft 30 on which a bed spring 31 may be wound. The term "bed spring" as used herein is intended to include a canvas member adapted to function as a bed spring, and if a canvas member is used I prefer to attach said canvas member to the frame by means of small coil springs at one end thereby rendering it more resilient. Compartment 29 may be formed of sheet metal and welded to frame 18, and shaft 30 may be journaled in said sheet metal. Fastening members 32 attached to the rear end member of frame 18 are adapted to engage spring 31, when the latter is unrolled, and to hold it securely while shaft 30 is turned to make said spring taut. To facilitate turning said shaft, twin cranks 33 may be fixedly secured to the end thereof and any convenient piece of wood may then be inserted between said cranks to act as a lever. A ratchet 34 is attached to said shaft, and pawl 35 is caused to engage the same by the force of gravity. In this way, the bed spring will be automatically held at the proper tension by said pawl, but the latter may be flipped over out of engagement with the ratchet when said spring is to be loosened, detached, and wound up.

It is to be noted in Fig. 4 that compartment 29 is provided with a flat top in horizontal alinement with the top of section 7 when it is carried by the frame member 18. Thus the upper section 6 can be swung to a vertical position, as is illustrated in dotted lines in said figure, to be supported by said flat upper top of said housing 29.

The equipment comprising the invention herein disclosed is intended to increase the comfort of fishermen, or other campers, and by its convenience to reduce the labor of camping. It is desirable that said equipment be reasonably light in weight for easy transportation and handling, and to this end, and also for economy, two different structures are adapted to serve more than one purpose. That is, the frame of the trailer serves as a bed and also as a support for a canopy, and the boat serves as a dust-proof and water-proof compartment for supplies. Thus, it is possible to take a boat on long trips and over rough roads where heretofore it was impossible because a long boat would not follow a car satisfactorily at high speeds and around sharp bends. But my invention has not only removed the difficulty of transporting said boat; it has made it advantageous to take a boat along even on trips on which no boat can be used. Hauling said boat, in its folded form, is well worthwhile as a means for transporting supplies.

I claim:

1. A trailer of the character described, comprising a mobile vehicular support, a frame for said support, said frame provided with a marginal member having an upstanding vertical web formed thereon and a horizontal web of limited width joined thereto defining a recess, and a removable body for said trailer, said body being formed of a plurality of sections each having a flat end hingedly secured to a similar end of another body section and adapted in closed position to be stacked one on the other, the lowermost body section adapted to seat in said recess conforming to the frame dimensions and adapted to rest upon said horizontal web and to be closely encompassed by said vertical web.

2. A trailer of the character described, comprising a mobile vehicular support, a frame for said support, a removable body for said trailer, supported by said frame, said body being formed of a plurality of sections each having a flat end hingedly secured to a similar end of another body section and adapted in closed position to be stacked one on the other, and a compartment carried by said frame, extending along one end of said frame, said compartment being open only toward said frame, said lowermost body section when supported by said frame being arranged with its hinged end in abutment with and closing the open side of said compartment.

3. A trailer of the character described, comprising a mobile vehicular support, a frame for said support, a removable body for said trailer, supported by said frame, said body being formed of a plurality of sections each having a flat end hingedly secured to a similar end of another body section and adapted in closed position to be stacked one on the other, and an upstanding compartment carried by said frame, extending along one end of said frame, said compartment being flat topped, of a height comparable to that of the depth of the lowermost body section, the uppermost body section being proportioned and arranged to be swung upwardly about its hinged connection and to seat endwise upon said flat topped compartment.

4. A trailer of the character described, comprising a mobile vehicular support, a frame for said support, said frame provided with a marginal member having an upstanding vertical web formed thereon and a horizontal web of limited width joined thereto, said marginal member extending about two sides of said frame and one end thereof, and a removable body for said trailer, said body being formed of a plurality of sections each having a flat end hingedly secured to a similar end of another body section and adapted in closed position to be stacked one on the other, the lowermost body section having dependent sections extending downwardly therefrom, said vehicular support frame being apertured to receive said dependent sections.

5. A trailer of the character described, comprising a mobile vehicular support, a frame for said support defining a body holding recess, a removable body for said trailer adapted to seat in said recess and be supported by said frame, a compartment carried by said frame, extending along one end of said frame, a reel journaled in said compartment, and a flexible element adapted to be spooled thereon and secured thereto by one end thereof, said flexible element being proportioned to overlie said frame member when said element is extended and be spaced vertically above said body recess.

6. A trailer of the character described, comprising a mobile vehicular support, a frame for said support defining a body holding recess, a removable body for said trailer adapted to seat in said recess and be supported by said frame, a compartment carried by said frame extending along one end of said frame, a flexible element proportioned to overlie said frame member when said element is extended and be spaced vertically above said body recess, means carried in said compartment and other means carried by the end of said frame distant from said compartment, said two means being adapted to engage the opposite ends of said flexible element, and adjustable means for applying tension to said flexible element.

7. A trailer of the character described, comprising a mobile vehicular support, a frame for said support defining a body holding recess, a removable body for said trailer adapted to seat in said recess and be supported by said frame, a compartment carried by said frame, extending along one end of said frame, a reel journaled in said compartment, a flexible element adapted to be spooled thereon and secured thereto by one end thereof, said flexible element being proportioned to overlie said frame member when said element is extended and be spaced vertically above said body, and a series of spaced clips carried by the end of said frame distant from said compartment, said clips being adapted to be engaged by the free end of said flexible element.

8. A trailer of the character described, comprising a mobile vehicular support, a frame for said support defining a body holding recess, a removable body for said trailer adapted to seat in said recess and be supported by said frame, a compartment carried by said frame, extending along one end of said frame, a flexible element proportioned to overlie said frame member when said element is extended and be spaced vertically above said body recess, means carried in said compartment, and other means carried by the end of said frame distant from said compartment, said two means being adapted to engage the opposite ends of said flexible element, adjustable means for applying tension to and for locking said flexible element in tension, thereby adapted to hold said flexible element stretched across said vehicular support frame.

9. A trailer of the character described, comprising a mobile vehicular support, a frame for said support, a removable body for said trailer, supported by said frame, said body being formed of a plurality of sections each having a flat end hingedly secured to a similar end of another body section and adapted in closed position to be stacked one on the other, a compartment carried by said frame, extending along one end of said frame, a flexible element proportioned to overlie said frame member when said element is extended, means carried in said compartment and other means carried by the end of said frame distant from said compartment, said two means being adapted to engage the opposite ends of said flexible element, adjustable means for applying tension to said flexible element adapted to hold said flexible element stretched across said vehicular support frame.

10. A trailer of the character described, comprising a mobile vehicular support, an elongated frame for said support, said frame provided with a marginal member having an upstanding vertical web formed thereon and a horizontal web of limited width joined thereto, said marginal member extending about two sides of said frame and one end thereof, a removable body for said trailer, said body being formed of a plurality of sections each having a flat end hingedly secured to a similar end of another body section and adapted in closed position to be stacked one on the other, the lowermost body section conforming to the frame dimensions and adapted to rest upon said horizontal web and to be closely encompassed by said vertical web, and a compartment carried by said frame, extending along the end of said frame not bounded by said marginal member, said compartment being open only toward said frame, said body when supported by said frame being arranged with one of its hinged ends in abutment with and closing the open side of said compartment.

11. A vehicle of the class described comprising a mobile vehicular support provided with towing connections, a body portion adapted to be mounted upon said support and being removable therefrom, said support comprising an elongated frame and a particular enclosed housing extending laterally of said frame across one end thereof, said housing opening toward said frame, said body portion when in position covering said housing opening, means in said housing and arranged at the opposite end of said frame for detachably securing and for supporting a flexible covering extending across said frame.

12. A vehicle of the class described comprising a mobile vehicular support provided with towing connections, a body portion adapted to be mounted upon said support and being removable therefrom, said support comprising an elongated frame and a partially enclosed housing extending laterally of said frame across one end thereof, said housing opening toward said frame, said body portion when in position covering said housing opening, means in said housing and arranged at the opposite end of said frame for detachably securing and for supporting a flexible covering extending across said frame, a canopy support at the marginal edges of said frame arranged exteriorly of the body portion.

13. A vehicle of the class described comprising a mobile vehicular support provided with towing connections, a body portion adapted to be mounted upon said support and being removable therefrom, said support comprising an elongated frame and a partially enclosed housing extending laterally of said frame across one end thereof, said housing opening toward said frame, said body portion when in position covering said housing opening, a journalled reel in said housing and securing devices arranged at the opposite end of said frame for detachably securing and for supporting a flexible covering extending across said frame, a canopy support at the marginal edges of said frame arranged exteriorly of the body portion.

OSCAR W. OLSON.